(12) United States Patent
Herman et al.

(10) Patent No.: US 9,251,275 B2
(45) Date of Patent: Feb. 2, 2016

(54) DATA CLUSTERING AND USER MODELING FOR NEXT-BEST-ACTION DECISIONS

(71) Applicant: International Business Machines Corporation, Armonk, NY (US)

(72) Inventors: Norbert Herman, Denver, CO (US); Daniel T. Lambert, Manhattan, NY (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 13/895,947

(22) Filed: May 16, 2013

(65) Prior Publication Data
US 2014/0344270 A1    Nov. 20, 2014

(51) Int. Cl.
G06F 17/30    (2006.01)

(52) U.S. Cl.
CPC .............................. *G06F 17/30867* (2013.01)

(58) Field of Classification Search
CPC .......... G06F 17/3071; G06F 17/30864; G06F 17/30598
USPC .......... 707/737, 780, 769, 711, 756, 5; 705/5, 705/10, 7.32; 704/270
See application file for complete search history.

(56) References Cited

U.S. PATENT DOCUMENTS

| | | | |
|---|---|---|---|
| 7,720,784 B1 | 5/2010 | Froloff | |
| 7,917,366 B1 * | 3/2011 | Levanon et al. | 704/270 |
| 2002/0161664 A1 * | 10/2002 | Shaya et al. | 705/26 |
| 2008/0104052 A1 * | 5/2008 | Ryan et al. | 707/5 |
| 2008/0152231 A1 * | 6/2008 | Gokturk et al. | 382/209 |
| 2009/0327243 A1 | 12/2009 | Pradhan et al. | |
| 2010/0306249 A1 * | 12/2010 | Hill et al. | 707/769 |
| 2011/0179081 A1 * | 7/2011 | Ovsjanikov et al. | 707/780 |
| 2012/0130771 A1 * | 5/2012 | Kannan et al. | 705/7.32 |
| 2012/0233179 A1 | 9/2012 | MacGuire et al. | |
| 2013/0124298 A1 * | 5/2013 | Li et al. | 705/14.42 |
| 2013/0159310 A1 * | 6/2013 | Birdwell et al. | 707/737 |
| 2013/0173583 A1 * | 7/2013 | Hueter et al. | 707/711 |
| 2014/0079297 A1 * | 3/2014 | Tadayon et al. | 382/118 |
| 2014/0181128 A1 * | 6/2014 | Riskin et al. | 707/756 |

OTHER PUBLICATIONS

Lambert, D. et al., "Sample of Top Products & Sample Companies", disclosure dated Aug. 31, 2012, 2 pages, submitted under 35 U.S.C. 102(b)(1)(A).

* cited by examiner

*Primary Examiner* — Jeffrey A Burke
*Assistant Examiner* — Thong Vu
(74) *Attorney, Agent, or Firm* — Maeve L. McCarthy; Hunter E. Webb; Keohane & D'Alessandro PLLC (57) ABSTRACT

Embodiments herein provide data clustering and user modeling for next-best-action decisions. Specifically, a modeling tool is configured to: receive indicators within unstructured social data from a plurality of users; analyze the unstructured social data of each of the plurality of users to assign a set of feature vectors to each of the plurality of users, each feature vector corresponding to one or more personality characteristics of each of the plurality of users; and analyze the feature vectors to identify two or more users from the plurality of users sharing a set of similar feature vectors. The modeling tool is further configured to: group the two or more users from the plurality of users sharing the set of similar feature vectors to form a cluster; identify attributes of the cluster; and input the attributes of the cluster into a predictive model to determine an offer corresponding to the cluster.

20 Claims, 6 Drawing Sheets

DATA CLUSTERING AND USER MODELING FOR NEXT-BEST-ACTION DECISIONS

STATEMENT REGARDING PRIOR DISCLOSURES BY THE INVENTOR OR A JOINT INVENTOR

The following disclosure is submitted under 35 U.S.C. 102(b)(1)(A): DISCLOSURE: *Sample of Top Products & Sample Companies*, disclosed by Daniel T. Lambert and Norbert Herman on Aug. 31, 2012, pages 1-2.

FIELD OF THE INVENTION

The present invention relates generally to statistical analysis of large datasets and, more specifically, to data clustering and user modeling for next-best-action decisions.

BACKGROUND OF THE INVENTION

By some estimates, 80% of a company's useful customer information is stored in unstructured data. This includes blogs, e-mails, forum posts, social media, and, increasingly, transcripts of phone calls. Each touch point with the customer results in potentially useful information about purchasing behaviors, lifestyles, interests, and the like. However, companies have not found a way to adequately capture this information and turn the data into useful action items.

There are a number of current art solutions that act as data aggregators or filters. These solutions are effective at enabling many representatives to contact customers, and generally monitor brand awareness. However, these solutions fall short in their ability to recognize and report the next best action to take with the customer.

With existing solutions, the content of the message is usually drafted by a customer service representative or the like. As such, there is no known way to automatically capture the attitudes and sentiment of the consumer towards various products. This is especially problematic at scale. First, companies with millions of customers cannot manually read every e-mail, social media post, etc. Second, humans may not be able to recognize less obvious shopping patterns and tendencies. Humans may fail to notice many buyer pattern correlations because they are often nonsensical or not apparent unless statistically derived. Accordingly, what is needed is a solution that solves at least one of the above-identified deficiencies.

SUMMARY OF THE INVENTION

In general, embodiments herein provide data clustering and user modeling for next-best-action decisions. Specifically, a modeling tool is configured to receive unstructured social data from a plurality of users, the unstructured social data including one or more indicators that indicate at least one of: sentiment, personality, and emotional state; analyze the unstructured social data of each of the plurality of users to assign a set of feature vectors to each of the plurality of users, each of the set of feature vectors corresponding to one or more personality characteristics of each of the plurality of users; and analyze the set of feature vectors to identify two or more users from the plurality of users sharing a set of similar feature vectors. The modeling tool is further configured to group the two or more users from the plurality of users sharing the set of similar feature vectors to form a cluster; identify attributes of the cluster; and input the attributes of the cluster into a predictive model to determine a commercial offer that corresponds to the cluster.

In one embodiment, there is a method for data clustering and user modeling for next-best-action decisions. In this embodiment, the method comprises the computer-implemented steps of: receiving unstructured social data of a plurality of users, the unstructured social data comprising one or more indicators that indicate at least one of: sentiment, personality, and emotional state; analyzing the unstructured social data of each of the plurality of users to assign a set of feature vectors to each of the plurality of users, each of the set of feature vectors corresponding to one or more personality characteristics of each of the plurality of users; analyzing the set of feature vectors to identify two or more users from the plurality of users sharing a set of similar feature vectors; grouping the two or more users from the plurality of users sharing the set of similar feature vectors to form a cluster; identifying attributes of the cluster; and inputting the attributes of the cluster into a predictive model to determine a commercial offer that corresponds to the cluster.

In another embodiment, there is a system for data clustering and user modeling for next-best-action decisions. In this embodiment, the system comprises at least one processing unit, and memory operably associated with the at least one processing unit. A modeling tool is storable in memory and executable by the at least one processing unit. The modeling tool comprises an analyzing component configured to: receive unstructured social data from a plurality of users, the unstructured social data comprising one or more indicators that indicate at least one of: sentiment, personality, and emotional state; analyze the unstructured social data of each of the plurality of users to assign a set of feature vectors to each of the plurality of users, each of the set of feature vectors corresponding to one or more personality characteristics of each of the plurality of users; and analyze the set of feature vectors to identify two or more users from the plurality of users sharing a set of similar feature vectors; a clustering component configured to: group the two or more users from the plurality of users sharing the set of similar feature vectors to form a cluster; and identify attributes of the cluster; and an offering component configured to input the attributes of the cluster into a predictive model to determine a commercial offer that corresponds to the cluster.

In another embodiment, there is a computer-readable storage medium storing computer instructions, which when executed, enables a computer system to provide data clustering and user modeling for next-best-action decisions. In this embodiment, the computer instructions comprise: receiving unstructured social data of a plurality of users, the unstructured social data comprising one or more indicators that indicate at least one of: sentiment, personality, and emotional state; analyzing the unstructured social data of each of the plurality of users to assign a set of feature vectors to each of the plurality of users, each of the set of feature vectors corresponding to one or more personality characteristics of each of the plurality of users; analyzing the set of feature vectors to identify two or more users from the plurality of users sharing a set of similar feature vectors; grouping the two or more users from the plurality of users sharing the set of similar feature vectors to form a cluster; identifying attributes of the cluster; and inputting the attributes of the cluster into a predictive model to determine a commercial offer that corresponds to the cluster.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The invention will now be described more fully herein with reference to the accompanying drawings, in which exemplary embodiments are shown. Embodiments of the invention provide data clustering and user modeling for next-best-action decisions. Specifically, a modeling tool is configured to receive unstructured social data from a plurality of users, the unstructured social data including one or more indicators that indicate at least one of: sentiment, personality, and emotional state; analyze the unstructured social data of each of the plurality of users to assign a set of feature vectors to each of the plurality of users, each of the set of feature vectors corresponding to one or more personality characteristics of each of the plurality of users; and analyze the set of feature vectors to identify two or more users from the plurality of users sharing a set of similar feature vectors. The modeling tool is further configured to group the two or more users from the plurality of users sharing the set of similar feature vectors to form a cluster; identify attributes of the cluster; and input the attributes of the cluster into a predictive model to determine a commercial offer that corresponds to the cluster.

This disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "computing," "determining," "evaluating," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

Figure 1:
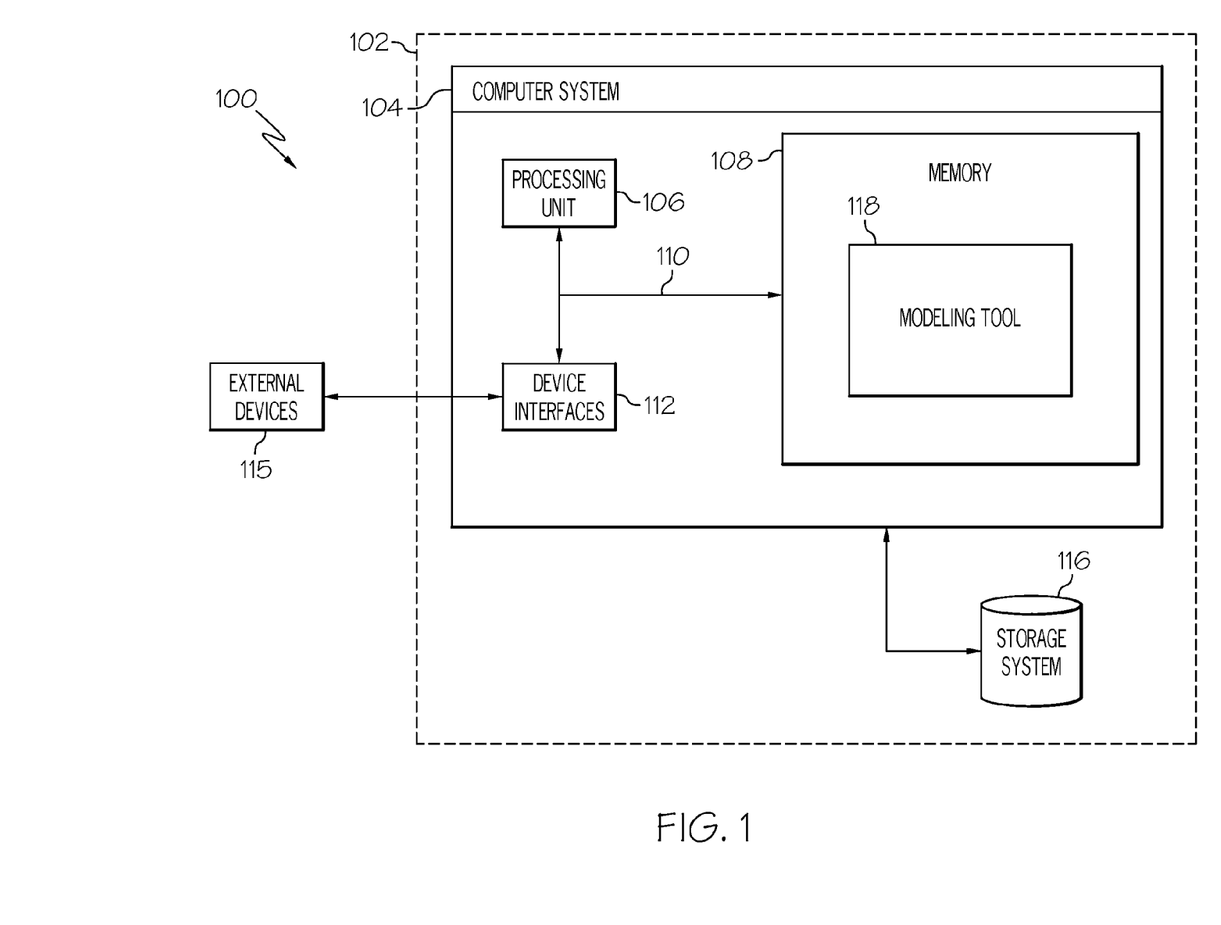
FIG. 1 shows a schematic of an exemplary computing environment in which elements of the present embodiments may operate.

Referring now to FIG. 1, a computerized implementation 100 of the present invention will be described in greater detail. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), a cloud-computing environment, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for data clustering and user modeling for next-best-action decisions. It should be understood that any other computers implemented under the present invention may have different components/software, but will perform similar functions. As shown, computer system 104 includes a processing unit 106 capable of communicating with a modeling tool 118 stored in memory 108, a bus 110, and device interfaces 112.

Processing unit 106 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 106 collects and routes signals representing inputs and outputs between external devices 115 and modeling tool 118. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating modeling tool 118, which is stored in memory 108 and/or storage system 116. While executing computer program code, processing unit 106 can read and/or write data to/from memory 108, storage system 116, and modeling tool 118. Storage system 116 can include VCRs, DVRs, RAID arrays, USB hard drives, optical disk recorders, flash storage devices, and/or any other data processing and storage elements for storing and/or processing data. Although not shown, computer system 104 could also include I/O interfaces that communicate with one or more external devices 115 that enable interaction with computer system 104 (e.g., a cellular phone, a smart phone, a keyboard, a pointing device, a display, etc.).

Figure 2:
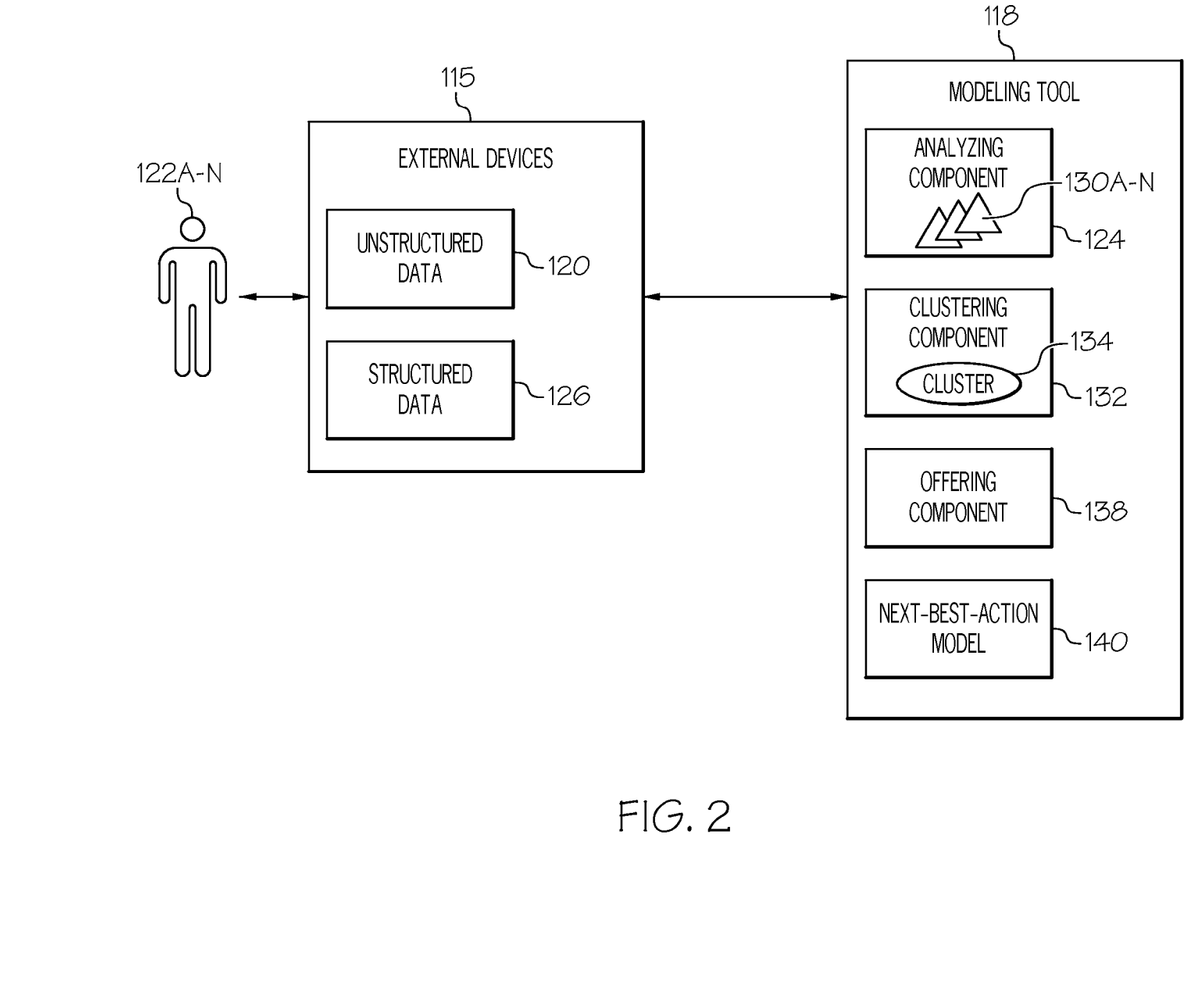
FIG. 2 shows a more detailed view of a modeling tool according to embodiments of the invention.

Referring now to FIG. 2, operation of modeling tool 118 will be described in greater detail. As shown, FIG. 2 is a block diagram illustrating an example of a combination of processing components that can be used for implementing modeling tool 118 in implementation 100 illustrated in FIG. 1. In an exemplary embodiment, modeling tool 118 receives, clusters, and models unstructured social data 120 from a plurality of users 122A-N (e.g., customers or potential customers). To accomplish this, modeling tool 118 comprises an analyzing component 124 configured to receive unstructured social data 120 from plurality of users 122A-N, wherein the unstructured social data 120 comprises one or more indicators (e.g., text) that indicates sentiment (e.g., towards a particular product or company), personality, emotion, etc. In one embodiment, analyzing component 124 is also configured to receive structured data 126 (e.g., a history of past transactions). In this case, the combination of unstructured social data 120 and structured data 126 can provide even deeper insight into what the next-best-action can be with a user or group of users.

Analyzing component 124 is then configured to analyze unstructured social data 120 of each user 122 to assign a set of feature vectors 130A-N to each of plurality of users 122A-N, each of set of feature vectors 130A-N corresponding to one or more personality characteristics of each of plurality of users 122A-N. In one embodiment, analyzing component 124 takes large quantities of social media data and generates each feature vector 130 based on text from all of the different available sources/channels. Each feature vector 130 may be simple, e.g., mention of a keyword, or highly complex, e.g., a neuroticism score of user 122. It will be appreciated that there are many possible feature vectors that can be applied to the data, and even more can be created or customized, depending on the type of data available. In one embodiment, multiple feature vectors from set of feature vectors 130A-N are combined to generate a set of higher-level feature vectors.

Once each user 122 has been assigned as many feature vectors 130 as is reasonable, modeling tool 118 then determines customer clusters. To accomplish this, analyzing component 124 is further configured to analyze set of feature vectors 130A-N to identify two or more users from plurality of users 122A-N sharing a set of similar feature vectors. Modeling tool 118 comprises a clustering component 132, which is then configured to group the two or more users from plurality of users 122A-N sharing similar feature vectors to form a cluster 134. As will be appreciated, a large number of users and unstructured data may result in any number of different clusters. In one embodiment, clustering component 132 attempts to cluster similar users together while also spacing out the clusters where possible.

Clustering component 132 is further configured to identify attributes of cluster 134. That is, after users 122A-N have been clustered, the averages of the feature vectors are used to describe cluster 134. For example, cluster 134 may be 80% female, highly interested in DVR players based on social media mentions, outgoing, and have a high propensity for impulse buying. Cluster 134 and its associated attributes are then input, by an offering component 138, into a predictive model, e.g., a next-best-action (NBA) model 140, to determine a commercial offer corresponding to cluster 134.

In one embodiment, NBA model 140 is a marketing and advertising model that provides next-best-action decision-making, wherein NBA model 140 considers the different actions that can be taken for the users of cluster 134 and decides on the 'best' one. The NBA (e.g., an offer, proposition, service, etc.) is determined by the attributes of cluster 134, as well as a marketing organization's business objectives, policies, and regulations on the offer. NBA model 140 reliably achieves NBA capabilities in high volumes as well as in real-time. In one embodiment, this requires some form of decisioning hub that leverages decision logic to combine an advertisers business rules with predictive and adaptive decisioning models to help determine how to target and solicit cluster 134. The decisioning authority takes into account each user's expectations, propensities and likely behavior through the use of predictive modeling. The result is one or more commercial offers identified and selected for cluster 134, e.g., from a predetermined selection of commercial offers. If feedback is received from cluster 134 in response to the commercial offering(s), offering component 138 is configured to receive the one or more commercial offers and evaluate the grouping of the two or more users from plurality of users 122A-N of cluster 134 based on the response.

Figure 3:
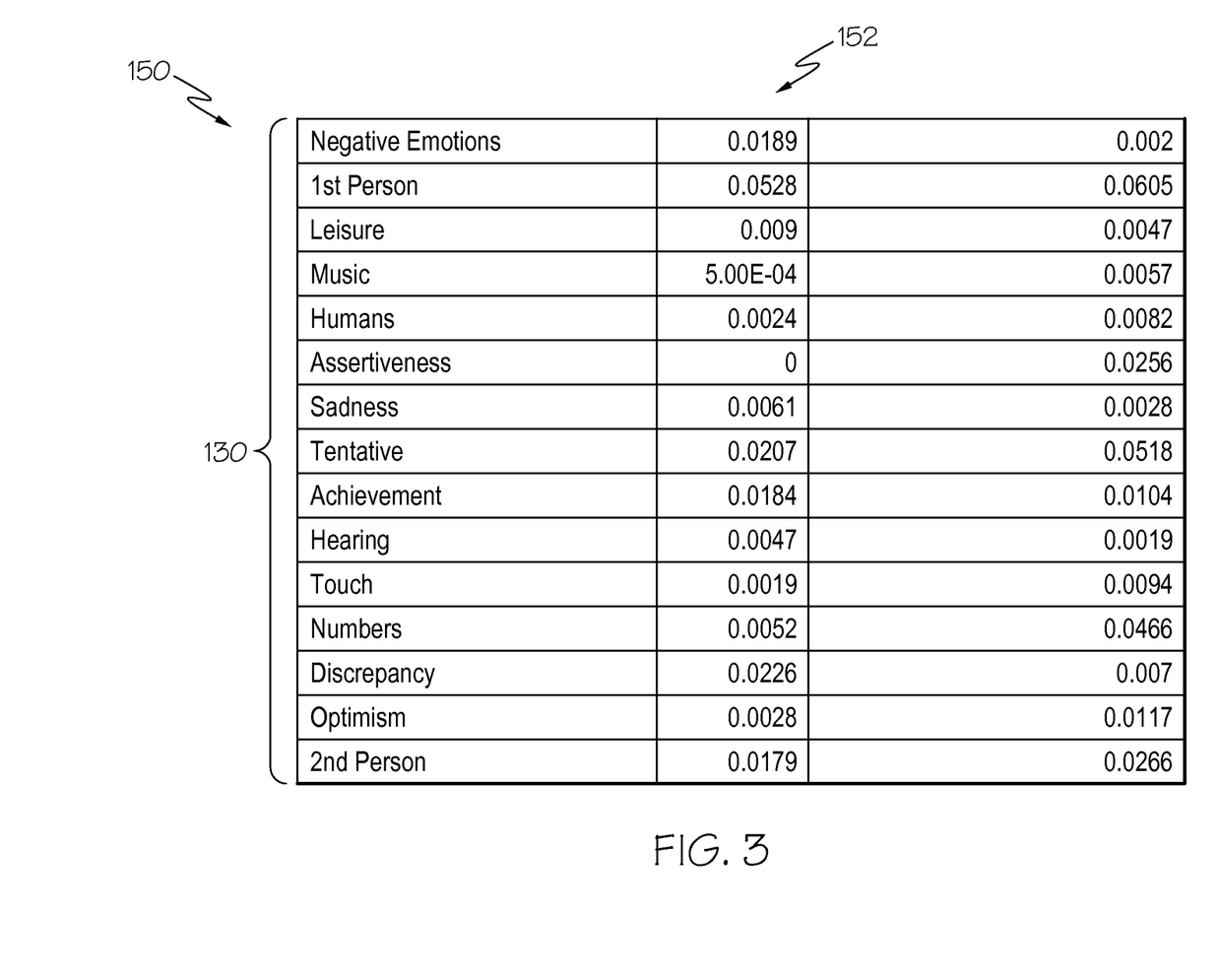
FIG. 3 shows an exemplary implementation of the modeling tool according to embodiments of the invention.

Turning now to FIG. 3, analyzing component 124 of FIG. 2 will be described in greater detail. Shown here is a sample 150 of feature vectors 130 that can be identified from unstructured data. Depending on the source/channel, unstructured data brings in many insights about the customer. Importantly to companies/advertisers, some of the text indicates an intent to purchase. Key words like 'I want', 'I need', or 'I hope' are $1^{st}$ person textual examples that can be leveraged as indicators of interest in a certain product or product category. Conversely, words like tad, 'too expensive', and 'dislike' show negative sentiment towards a brand or product segment. These different levels of sentiment can be stored as customer scores 152 on different dimensions.

In one embodiment, customer scores 152 are based on frequency and recentness of words that indicate the particular sentiment. For example, if calculating an egotistical customer score, use of the first person (e.g., "I", "me", "mine", etc.) is considered. If calculating an empathy score, analyzing component 124 looks for the frequency of words that indicate caring, loving etc. This may also be supplemented by analysis of sentence structure.

Psycholinguistic libraries may also be leveraged to identify these feature vectors 130. In certain embodiments, traits are discerned by looking over a multi-channel history of communications. For example, e-mail and social media accounts could be used in tandem to identify one or more feature vectors 130. Alternatively, some feature vectors 130 can be determined by a single post, e.g., a blog entry or social media status update. These feature vectors 130 can also be tied to specific product mentions. For example, 'wealthy' and 'high propensity to buy' feature vectors could be combined with mentions of a recently broken TV, which could eventually result in an offer of a high-end TV with a description of the latest features included in the TV. In one embodiment, these feature vectors 130 can also be combined to create higher-level attributes, such as 'Company or Individual', 'Likelihood of Response', 'Neuroticism' and the like.

Figure 4:
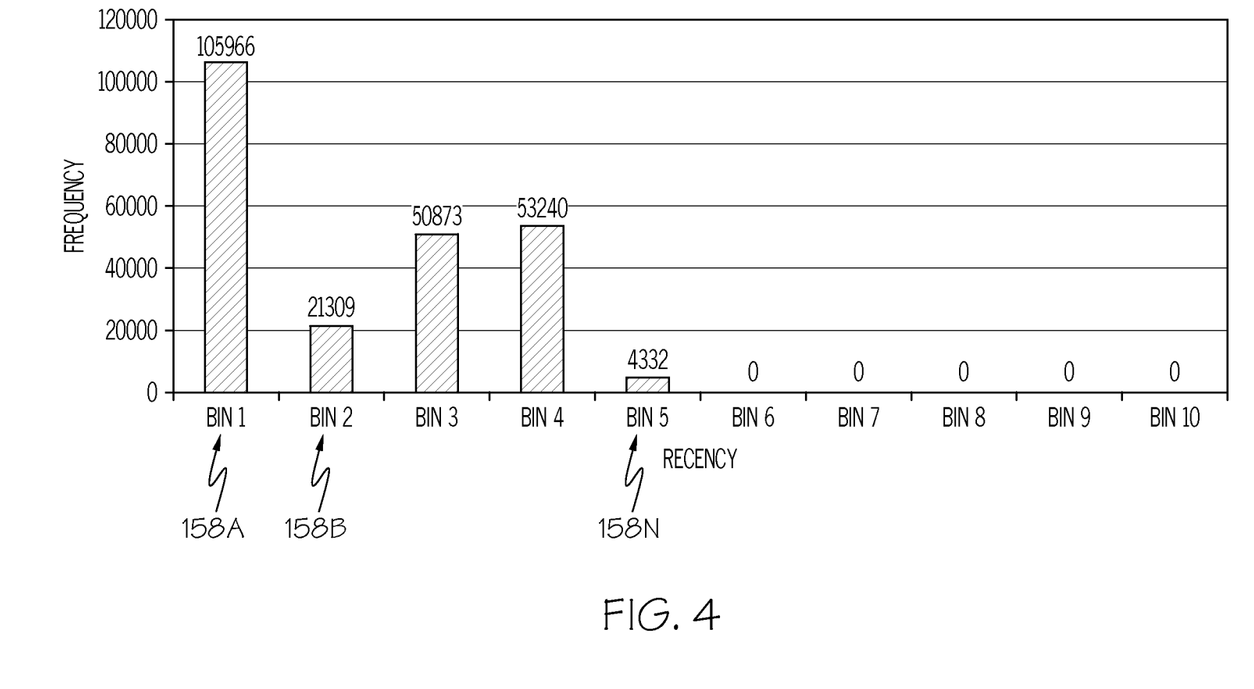
FIG. 4 shows exemplary implementation of the modeling tool according to embodiments of the invention.
Figure 5:
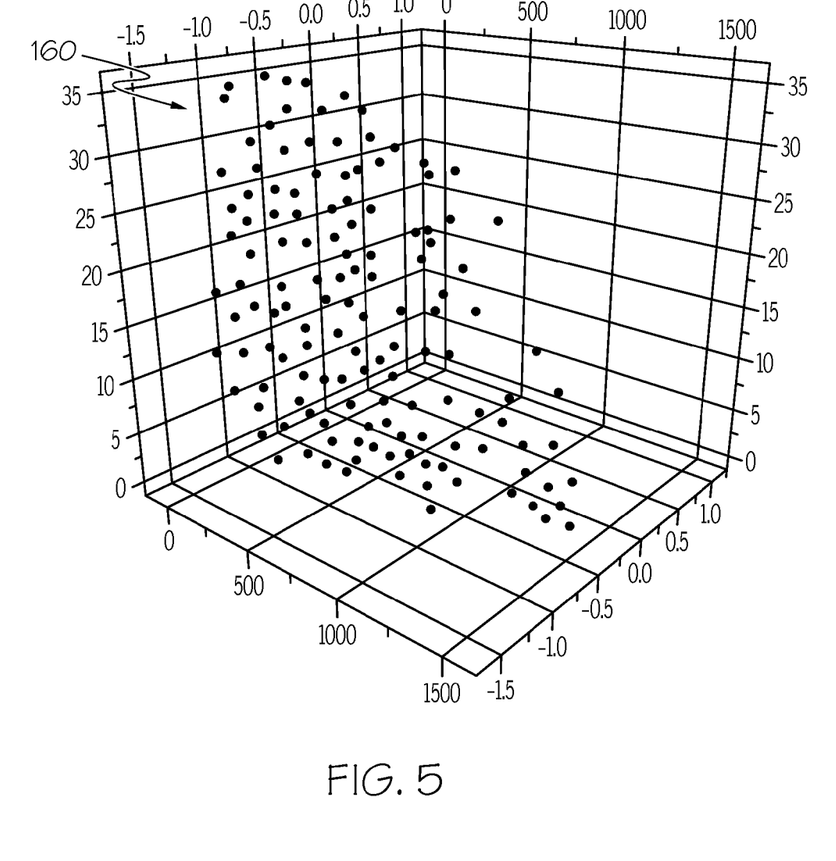
FIG. 5 shows exemplary implementation of the modeling tool according to embodiments of the invention.

Referring now to FIGS. 4-5, a non-limiting example of how clustering occurs (e.g., via clustering component 132) after feature vectors 130 have been identified will be described. In this embodiment, the following steps are performed.

1. Assign a value to each feature vector 130 for each user. For example, a feature vector formula may be run on each customer and stored in a temporary table for processing. In one embodiment, the feature vector formula calculates a value/score for a particular personality characteristic of a user based on a frequency and recentness of one or more indicators (e.g., words, terms, expressions, etc.) that are indicative of the particular characteristic.

2. Group each feature vector 130 based on the assigned value. For example, once each customer has been assigned a value, a set of groups (e.g., 'bins' or 'buckets' or 'ranges') 158A-N are created for each of the feature vectors, as shown in FIG. 4. In this non-limiting embodiment, every feature vector of every user must be assigned into one of 5 valid bins.

3. Plot a graphical representation of the set of feature vectors 130 for each set of users based on the grouping. As shown in FIG. 5, users can then be 'plotted' as a graphical representation 160 with any number of different dimensions (i.e., feature vectors). Note, however, that graphical representation 160 is representative only, as only a limited number of dimensions may be simultaneously displayed.

4. Determine the difference between graphical representations of two or more users from the plurality of users. In this embodiment, the distance between each of these points of graphical representation 160 is calculated by measuring the difference between the feature vectors for each user pair. For example, compare Customer1Recency Bin and Customer2Recency Bin, Customer1Frequency Bin and Customer2Frequency Bin (FIG. 4), etc., until an aggregate distance is calculated. In this embodiment, differences are calculated by differences in bin assignment, not absolute difference.

5. Cluster users based on similarities (i.e., closeness in distance). Users that have minimal separation by distance are clustered together. Furthermore, various clusters are created that are as far away from each other as possible.

Once clustering is complete, each cluster is automatically assigned an offer based on the characteristics of the cluster and the offers available in a predetermined pool of offers. Ultimately, this results in a more specific offer for a narrower group of customers.

As described herein, the present invention provides a tool which reviews emails, blog entries, forum posts, etc., and other types of unstructured data, and classifies the author based on various attributes and traits. However, these traits are not limited to the likes or interests of the author, the browsing history, the demographic data, purchase history, etc. Instead, traits are analyzed to reveal the personality of the author. It can be appreciated that the approaches disclosed herein can be used within a computer system for data clustering and user modeling for next-best-action decisions, as shown in FIG. 1. In this case, modeling tool 118 can be provided, and one or more systems for performing the processes described in the invention can be obtained and deployed to computer infrastructure 102. To this extent, the deployment can comprise one or more of: (1) installing program code on a data center device, such as a computer system, from a computer-readable storage medium; (2) adding one or more data center devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 6:
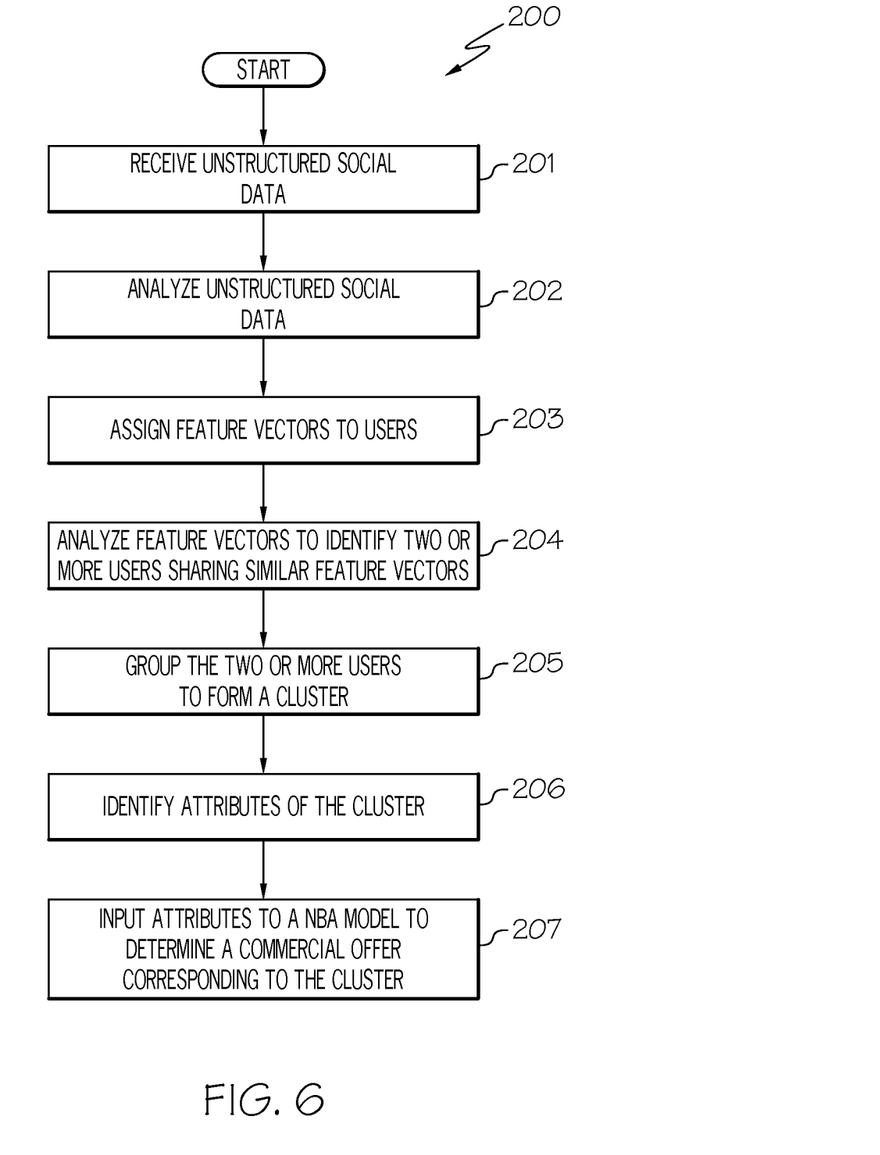
FIG. 6 shows a flow diagram for data clustering and user modeling for next-best-action decisions according to embodiments of the invention.

The program modules carry out the methodologies disclosed herein, as shown in FIG. 6. Shown is a process 200 for data clustering and user modeling for next-best-action decisions, wherein, at 201, unstructured social data is received. At 202, the unstructured social data is analyzed. At 203, a set of feature vectors is assigned to each of the plurality of users. At 204, each feature vector is analyzed to identify two or more users from the plurality of users sharing a set of similar feature vectors. At 205, the two or more users from the plurality of users sharing the set of similar feature vectors are grouped to form a cluster. Next, at 206, attributes of the cluster are identified, and the attributes are input to a predictive model to determine a commercial offer corresponding to the cluster at 207.

The flowchart of FIG. 6 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, as will be described herein, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

For example, an implementation of exemplary computer system 104 (FIG. 1) may be stored on or transmitted across some form of computer readable media. Computer readable media can be any available media that can be accessed by a computer. By way of example, and not limitation, computer readable media may comprise "computer storage media" and "communications media."

"Computer-readable storage device" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided an approach for data clustering and user modeling for next-best-action decisions. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for data clustering and user modeling for next-best-action decisions, the method comprising the computer-implemented steps of:

receiving unstructured social data of a plurality of users, the unstructured social data comprising one or more indicators including a set of words located in the unstructured social data that indicate at least one of: sentiment, personality, and emotional state;

analyzing the unstructured social data of each user of the plurality of users to assign a numerical value to each of a plurality of feature vectors to associate with each of the plurality of users based on the set of words of the one or more indicators located in the unstructured social data generated by the user, each of the set of feature vectors corresponding to one or more personality characteristics that include a learning style, a propensity to purchase, a socioeconomic class, and a personality trait of each of the plurality of users;

analyzing the set of feature vectors to identify two or more users from the plurality of users sharing a set of similar feature vectors;

grouping the two or more users from the plurality of users sharing the set of similar feature vectors to form a cluster;

identifying attributes of the cluster based on the feature vectors of the users grouped in the cluster; and inputting the attributes of the cluster into a predictive model to automatically determine a commercial offer that corresponds to the cluster.

2. The method according to claim 1, further comprising combining multiple feature vectors from the set of feature vectors to generate a set of higher-level feature vectors.

3. The method according to claim 1, further comprising receiving structured data of the plurality of users.

4. The method according to claim 3, the structured data comprises a history of past transactions.

5. The method according to claim 1, the analyzing the set of feature vectors comprising:

assigning a value to each of the set of feature vectors for each of the plurality of users, the value identifying a frequency and recentness of one or more indicators that indicate one or more personality characteristics corresponding to each of the set of feature vectors;

grouping each of the set of feature vectors based on the assigned value; and plotting a graphical representation of the set of feature vectors for each of the plurality of users based on the grouping.

6. The method according to claim 5, further comprising determining a difference between graphical representations of the two or more users from the plurality of users.

7. The method according to claim 1, further comprising selecting the commercial offer for the cluster from a predetermined selection of commercial offers.

8. The method according to claim 7, further comprising:
receiving a response corresponding to the commercial offer; and
evaluating the grouping of the two or more users from the plurality of users of the cluster based on the response to the commercial offer.

9. A computer system for data clustering and user modeling for next-best-action decisions, the system comprising:
at least one processing unit;
memory operably associated with the at least one processing unit; and
a modeling tool storable in memory and executable by the at least one processing unit, the modeling tool comprising:
an analyzing component configured to:
receive unstructured social data from a plurality of users, the unstructured social data comprising one or more indicators including a set of words located in the unstructured social data that indicate at least one of: sentiment, personality, and emotional state;
analyze the unstructured social data of each user of the plurality of users to assign a numerical value to each of a plurality of feature vectors to associated with each of the plurality of users based on the set of words of the one or more indicators located in the unstructured social data generated by the user, each of the set of feature vectors corresponding to one or more personality characteristics that include a learning style, a propensity to purchase, a socioeconomic class, and a personality trait of each of the plurality of users; and
analyze the set of feature vectors to identify two or more users from the plurality of users sharing a set of similar feature vectors;
a clustering component configured to:
group the two or more users from the plurality of users sharing the set of similar feature vectors to form a cluster; and
identify attributes of the cluster based on the feature vectors of the users grouped in the cluster; and
an offering component configured to input the attributes of the cluster into a predictive model to automatically determine a commercial offer that corresponds to the cluster.

10. The computer system according to claim 9, the analyzing component further configured to combine multiple feature vectors from the set of feature vectors to generate a set of higher-level feature vectors.

11. The computer system according to claim 9, the analyzing component further configured to receive structured data of the plurality of users, wherein the structured data comprises a history of past transactions.

12. The computer system according to claim 9, the analyzing component further configured to:
assign a value to each of the set of feature vectors for each of the plurality of users, the value identifying a frequency and recentness of one of more indicators that indicate one or more personality characteristics corresponding to each of the set of feature vectors;
group each of the set of feature vectors based on the assigned value;
plot a graphical representation of the set of feature vectors for each of the plurality of users based on the grouping; and
determine a difference between graphical representations of the two or more users from the plurality of users.

13. The computer system according to claim 9, the offering component further configured to select the commercial offer for the cluster from a predetermined selection of commercial offers.

14. The computer system according to claim 13, the offering component further configured to:
receive a response corresponding to the commercial offer; and
evaluate the grouping of the two or more users from the plurality of users of the cluster based on the response to the commercial offer.

15. A computer-readable storage device storing computer instructions, which when executed, enables a computer system to provide data clustering and user modeling for next-best-action decisions, the computer instructions comprising:
receiving unstructured social data of a plurality of users, the unstructured social data comprising one or more indicators including a set of words located in the unstructured social data that indicate at least one of: sentiment, personality, and emotional state;
analyzing the unstructured social data of each user of the plurality of users to assign a numerical value to each of a plurality of feature vectors to associated with each of the plurality of users based on the set of words of the one or more indicators located in the unstructured social data generated by the user, each of the set of feature vectors corresponding to one or more personality characteristics that include a learning style, a propensity to purchase, a socioeconomic class, and a personality trait of each of the plurality of users;
analyzing the set of feature vectors to identify two or more users from the plurality of users sharing a set of similar feature vectors;
grouping the two or more users from the plurality of users sharing the set of similar feature vectors to form a cluster;
identifying attributes of the cluster; and
inputting the attributes of the cluster into a predictive model to automatically determine a commercial offer that corresponds to the cluster.

16. The computer-readable storage device according to claim 15, the computer instructions further comprising combining multiple feature vectors from the set of feature vectors to generate a set of higher-level feature vectors.

17. The computer-readable storage device according to claim 15, further comprising computer instructions for receiving structured data of the plurality of users, wherein the structured data comprises a history of past transactions.

18. The computer-readable storage device according to claim 15, the computer instructions for analyzing further comprising:

assigning a value to each of the set of feature vectors for each of the plurality of users, the value identifying a frequency and recentness of one of more indicators that indicate one or more personality characteristics corresponding to each of the set of feature vectors;

grouping each of the set of feature vectors based on the assigned value;

plotting a graphical representation of the set of feature vectors for each of the plurality of users based on the grouping; and determining a difference between graphical representations of the two or more users from the plurality of users.

19. The computer-readable storage device according to claim 15, further comprising computer instructions for selecting the commercial offer for the cluster from a predetermined selection of commercial offers.

20. The computer-readable storage device according to claim 19, further comprising computer instructions for:

receiving a response corresponding to the commercial offer; and evaluating the grouping of the two or more users from the plurality of users of the cluster based on the response to the commercial offer.

* * * * *